June 4, 1935.  T. P. CHASE  2,004,062
BRAKE
Filed Dec. 23, 1933
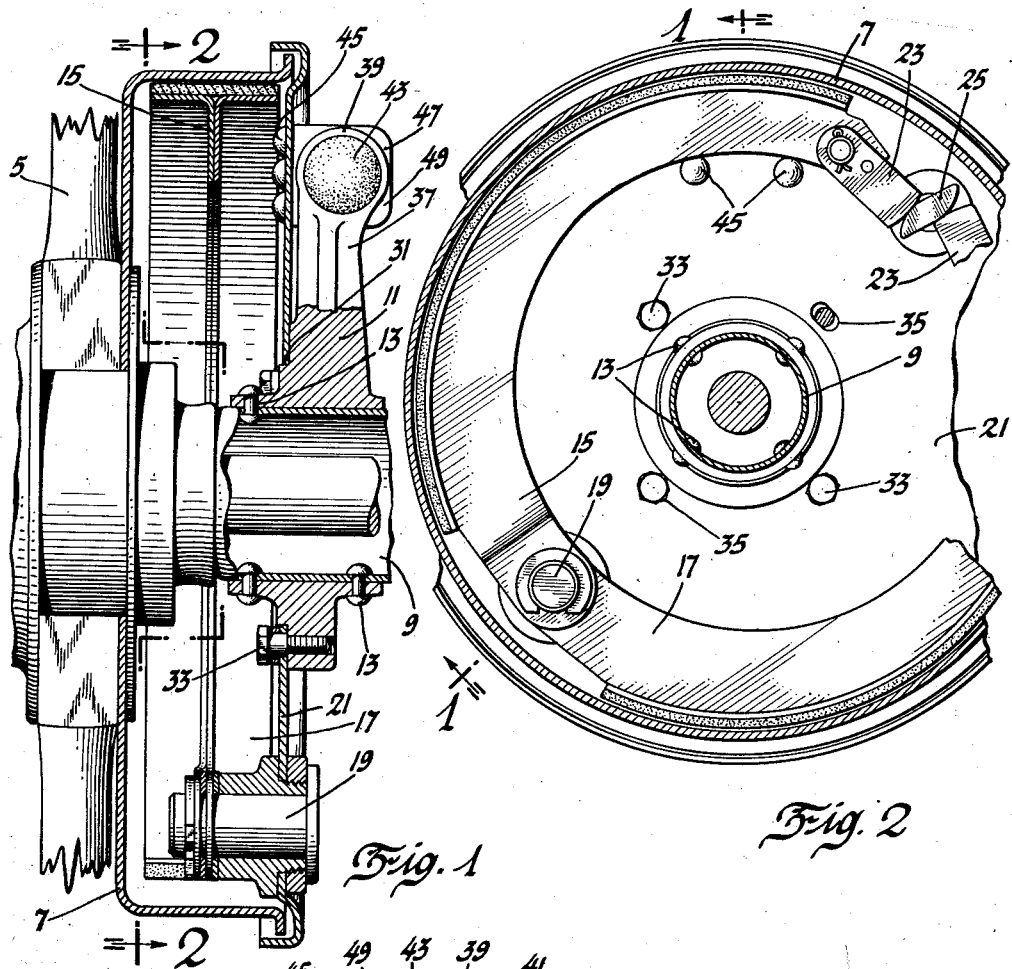
Fig. 1
Fig. 2
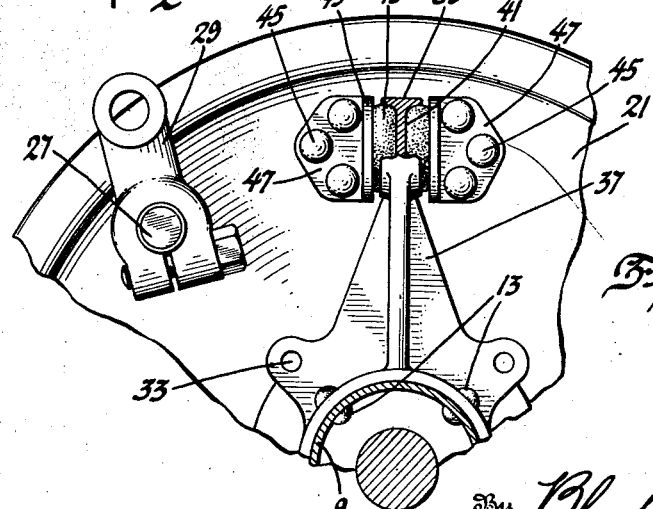
Fig. 3
Inventor
Theron P. Chase
By Blackmore, Spencer & Flint
Attorneys Patented June 4, 1935

2,004,062

UNITED STATES PATENT OFFICE 2,004,062

BRAKE

Theron P. Chase, Detroit, Mich., assignor, by mesne assignments, to General Motors Corporation, Detroit, Mich., a corporation of Delaware Application December 23, 1933, Serial No. 703,759

3 Claims. (Cl. 188—78)

This invention relates to brakes and particularly to wheel brakes for motor vehicles.

The object of the invention is to prevent brake chatter.

A more specific object is to provide resilient means to take the torque reaction resulting from brake application.

A still more specific object is to provide a block of rubber or the like between the anchor plate for the shoes and the axle.

Other objects and advantages will be understood from the following description.

In the accompanying drawing:

Fig. 1 is a transverse section through the novel mechanism on line 1—1 of Fig. 2.

Fig. 2 is a view in elevation of the shoes and operating mechanism as seen from line 2—2 of Fig. 1.

Fig. 3 is a view in elevation as seen from the right of Fig. 1.

Referring by reference characters to the drawing, numeral 5 designates one of the wheels of a vehicle to which wheel is secured in any convenient way a drum 7. The wheel rotates relatively to an axle housing 9. To the axle housing adjacent the wheel a bracket 11 is secured by rivets 13.

The brake is provided with shoes 15 and 17 pivoted on an anchorage 19 carried by a backing plate 21. The adjacent unanchored ends of the shoes are provided with pivoted roller sectors 23 engaged by a cam 25 on a shaft 27 having externally of the brake housing an arm 29. The mounting of shaft 27 should preferably be such as to permit the applied force to be equally divided between the shoes as is usual.

The backing plate 21 is mounted centrally on a circular shoulder 31 of the bracket 11. A plurality of fastening means 33 pass through arcuate slots 35 disposed at equal distances from the center of the plate 21 and are threaded into the bracket 11. By this means the anchor plate is mounted to have a slight rotary movement upon its supporting shoulder.

Bracket 11 has a radial arm 37 terminating in a head 39 having opposed recesses 41 within which are placed blocks 43 of rubber or other cushioning substance. Secured by rivets 45 adjacent the head 39 are angle plates 47. The flanges 49 of the angle plates engage the portions of the rubber block 43 projecting from the recesses of the head.

By the construction described, when the shoes are expanded by the cam into frictional contact with the rotating wheel drum, the backing plate to which is fixed the shoe anchor tends to be similarly rotated, provision for limited rotation being made at the fastening means 33. However, any such rotary movement is immediately cushioned and stopped by the parts 39, 43 and 49 as will be seen from an inspection of Fig. 3. This cushioning means through which the torque of brake operation is transmitted from the backing plate to the axle relieves the chatter which might occur if the backing plate were securely fixed to the axle housing.

I claim:

1. In a brake, a drum adapted to rotate, a coaxial cover plate for said drum, brake means carried by said cover plate and movable relatively thereto to frictionally engage and check rotation of said drum, a fixed bracket to receive the torque resulting from brake application, means to mount said cover plate for limited rotary movement relative to said bracket, and cushioning means to transmit torque from said cover plate to said bracket, together with a wheel carrying said drum, an axle member carrying said bracket, said bracket having a radial arm with a head, plates carried by said cover plate on each side of said head, and said cushioning means comprising a cushioning member between each plate and the adjacent side of said head.

2. For use on a vehicle having a fixed axle and a rotating wheel, a brake drum carried by the wheel, a cover plate closing said drum and carrying brake means to engage the drum, a radial arm rigid with the fixed axle and located adjacent the cover plate outside the drum enclosure, abutment means on the cover plate adjacent said arm, and cushioning means between said arm and said abutment means.

3. For use on a vehicle having a fixed axle and a rotating wheel, a brake drum carried by the wheel, a cover plate closing said drum and carrying brake means to engage the drum, a radial arm rigid with the fixed axle and located adjacent the cover plate outside the drum enclosure, abutments on said cover plate, one on each side of said arm and yielding means between each of said abutments and said arm.

THERON P. CHASE.